United States Patent
Panosyan et al.

(10) Patent No.: US 10,211,644 B2
(45) Date of Patent: Feb. 19, 2019

(54) SYSTEM AND METHOD FOR REGULATING VOLTAGE IN A LOW VOLTAGE POWER DISTRIBUTION SYSTEM

(71) Applicant: ABB Schweiz AG, Baden (CH)

(72) Inventors: Ara Panosyan, Munich (DE); Piniwan Thiwanka Bandara Wijekoon, Munich (DE); Stefan Schroeder, Munich (DE); Eva-Maria Baerthlein, Munich (DE)

(73) Assignee: ABB Schweiz AG, Baden (CH)

( * ) Notice: Subject to any disclaimer, the term of this patent is extended or adjusted under 35 U.S.C. 154(b) by 317 days.

(21) Appl. No.: 15/054,131

(22) Filed: Feb. 26, 2016

(65) Prior Publication Data

US 2017/0250542 A1    Aug. 31, 2017

(51) Int. Cl.
    *H02J 4/00*    (2006.01)
    *H02J 3/12*    (2006.01)

(52) U.S. Cl.
    CPC . *H02J 4/00* (2013.01); *H02J 3/12* (2013.01)

(58) Field of Classification Search
    CPC ................ H02J 4/00; H02J 1/00; G03F 1/00
    USPC .................... 323/247, 251, 255–258; 307/24
    See application file for complete search history.

(56) References Cited

U.S. PATENT DOCUMENTS

| | | | |
|---|---|---|---|
| 2,089,434 A | 8/1937 | Schermerhorn | |
| 4,130,789 A | 12/1978 | Neumann | |
| 5,414,590 A * | 5/1995 | Tajali | H02B 1/03 324/156 |
| 6,327,162 B1 * | 12/2001 | Larsen | H02J 3/1814 307/103 |
| 6,487,093 B1 * | 11/2002 | Vogman | H02M 3/33561 363/21.02 |
| 7,816,894 B2 * | 10/2010 | Feigin | H02M 5/22 323/247 |

(Continued)

FOREIGN PATENT DOCUMENTS

| | | |
|---|---|---|
| CN | 2595066 Y | 12/2003 |
| CN | 201878088 U | 6/2011 |

(Continued)

OTHER PUBLICATIONS

Extended European Search Report and Opinion issued in connection with corresponding EP Application No. 17157842.0 dated Jul. 21, 2017.

(Continued)

*Primary Examiner* — Dinh T Le
(74) *Attorney, Agent, or Firm* — Barnes & Thornburg LLP

(57) ABSTRACT

A power distribution system for providing a desired value of voltage regulation is presented. The system includes at least one power source, at least one sink, a distribution feeder configured to couple the at least one power source to the at least one sink. The system includes a plurality of modular voltage regulation units coupled to the distribution feeder, where each of the plurality of modular voltage regulation units includes a transformer including a primary winding having a first end and a second end and a secondary winding having a first end and a second end; and at least one switch coupled to the primary winding of the transformer, where the first end of the secondary winding is coupled to at least one of the first and second ends of the primary winding via the at least one switch. A method of operating a power distribution system is also presented.

19 Claims, 10 Drawing Sheets

(56) References Cited

U.S. PATENT DOCUMENTS

| | | | |
|---|---|---|---|
| 7,825,614 B2 | 11/2010 | Archdekin | |
| 9,639,104 B2 * | 5/2017 | Divan | G05F 3/02 |
| 9,640,990 B2 * | 5/2017 | Hardik | H02M 3/285 |
| 9,760,451 B2 * | 9/2017 | Totten | G06F 11/1471 |
| 2003/0043596 A1 | 3/2003 | Pai et al. | |
| 2013/0278235 A1 | 10/2013 | Divan et al. | |
| 2014/0266142 A1 | 9/2014 | Schaar | |

FOREIGN PATENT DOCUMENTS

| | | |
|---|---|---|
| DE | 10 2010 015276 A1 | 10/2011 |
| JP | 2008060217 A | 3/2008 |
| WO | 2011/127906 A2 | 10/2011 |

OTHER PUBLICATIONS

Kersting W.H, "Distribution Feeder Voltage Regulation Control", Industry Applications, IEEE Transactions on, vol. 46, Issue: 2, pp. 620-626, Mar.-Apr. 2010.

Tomlinson et al.,"Series-stacked medium voltage electronic voltage regulator",Energy Conversion Congress and Exposition (ECCE), 2011 IEEE,pp. 1087-1093, Phoenix, AZ,Sep. 17-22, 2011.

* cited by examiner

SYSTEM AND METHOD FOR REGULATING VOLTAGE IN A LOW VOLTAGE POWER DISTRIBUTION SYSTEM

BACKGROUND

Embodiments of the present specification generally relate to a power distribution system and more specifically to regulation of voltage in medium and low voltage power distribution systems.

In recent times, increased use of commercial photovoltaics (PV), residential photovoltaics, and electric vehicles (EV) by customers has resulted in fluctuations in a voltage profile along a feeder of power distribution systems. Accordingly, voltage regulation devices are being employed in conjunction with the feeder of the power distribution systems for circumventing the fluctuations in the voltage profile along the feeder. Typically, these voltage regulation devices are either based on mechanical and/or electronic on-load tap changers (OLTCs) or based on power electronic converters/inverters.

Conventionally, mechanical OLTCs have been used in high and medium voltage power distribution systems. However, while mechanical OLTCs are relatively inexpensive, the mechanical OLTCs are less suitable in low voltage power distribution systems. Also, large voltage fluctuations in the power distribution systems cause excessive operation of the mechanical OLTCs, which in turn results in increased wear and tear of the mechanical OLTCs.

Recently, fully electronic or electronically assisted (hybrid) OLTCs have been employed in the power distribution systems. These OLTCs are capable of operating at a higher switching frequency. Furthermore, these OLTCs have a longer life cycle due to absence of arcing during tap changing. However, the fully electronic or the electronically assisted OLTC solutions are more complex. Also, although the voltage regulation devices employing power electronic converters/inverters offer very high flexibility and enhanced functionalities, these voltage regulation devices are exceedingly high in cost.

Moreover, the installation cost of the existing voltage regulation devices is significantly higher when compared to the cost of individual voltage regulation devices. Also, when new PV installations and electric vehicles are connected to the feeder of the power distribution system, the feeder experiences voltage violations in a range from about ±1% to about ±2% from higher or lower limits of voltage for the feeder. Use of a higher number of new PV installations or EV connections results in the feeder experiencing a higher percentage of voltage violations. Currently, network operators address the issue of voltage violations via use of greater voltage regulation capabilities in order to avoid high installation costs in the future. Consequently, the currently available voltage regulation devices for low voltage power distribution systems are configured to provide voltage regulation in a range from about ±6% to about ±10% of the nominal voltage. However, in most cases this high value of voltage regulation may not be required.

BRIEF DESCRIPTION

In accordance with aspects of the present specification, a power distribution system for providing a desired value of voltage regulation is presented. The system includes at least one power source, at least one sink, a distribution feeder configured to couple the at least one power source to the at least one sink. Furthermore, the system includes a plurality of modular voltage regulation units coupled to the distribution feeder, where each of the plurality of modular voltage regulation units includes a transformer including a primary winding having a first end and a second end and a secondary winding having a first end and a second end; and at least one switch coupled to the primary winding of the transformer, where the first end of the secondary winding is coupled to at least one of the first and second ends of the primary winding via the at least one switch.

In accordance with another aspect of the present specification, a method of operating a power distribution system to provide a desired value of voltage regulation, where the power distribution system includes a distribution feeder and a plurality of modular voltage regulation units is presented. The method includes measuring, using a controller, one or more voltages corresponding to one or more locations along the distribution feeder, where the distribution feeder is configured to couple at least one power source to at least one sink, and where each of the plurality of modular voltage regulation units is coupled to the distribution feeder and includes a transformer including a primary winding having a first end and a second end and a secondary winding having a first end and a second end, at least one switch coupled to the primary winding of the transformer, where the first end of the secondary winding is coupled to at least one of the first and second ends of the primary winding via the at least one switch. The method further includes comparing, using the controller, the measured one or more voltages to a corresponding determined threshold. Also, the method includes determining, using the controller, a switching pattern of the at least one switch based on the comparison. Further, the method includes regulating, using the controller, a voltage at one or more locations along the distribution feeder based on the switching pattern to provide the desired value of voltage regulation.

In accordance with another aspect of the present specification, a distribution casing includes a housing including one or more racks, one or more fuse bases, one or more cable connectors, one or more busbars, or combinations thereof. Further, at least one modular voltage regulation unit is disposed in the housing, where the at least one modular voltage regulation unit is coupled in series with at least one other modular voltage regulation unit, where the at least one other modular voltage regulation unit is disposed within the housing or external to the housing, and where at least one modular voltage regulation unit includes a transformer including a primary winding having a first end and a second end and a secondary winding having a first end and a second end, and at least one switch coupled to the primary winding of the transformer, where the first end of the secondary winding is coupled to at least one of the first and second ends of the primary winding via the at least one switch.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

As will be described in detail hereinafter, various embodiments of a power distribution system configured to provide voltage regulation and a method for operating the power distribution system to provide a desired value of voltage regulation are presented. The power distribution system is configured to regulate the voltage within a desired range of voltages.

Figure 1:
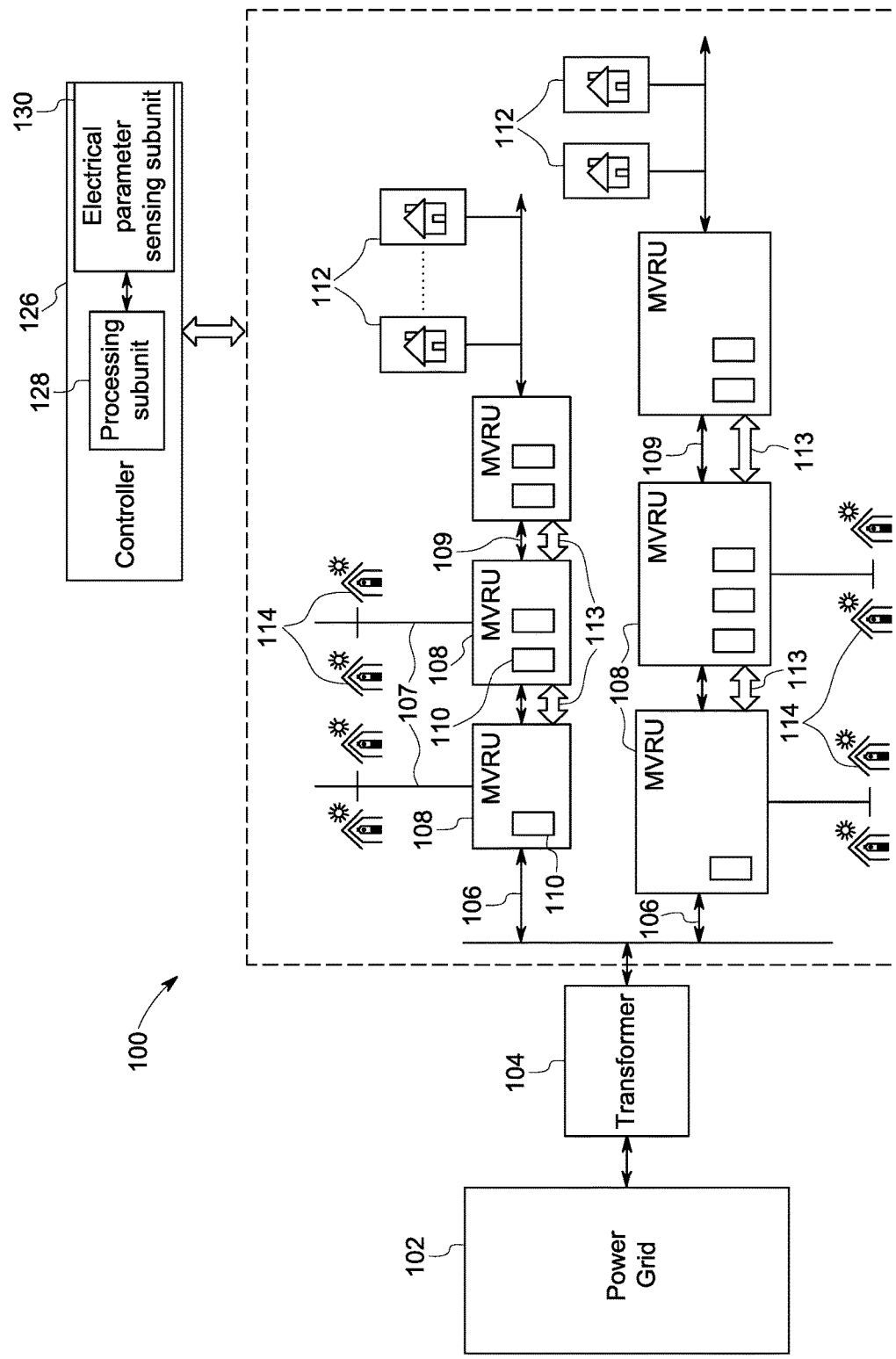
FIG. 1 is a diagrammatical representation of a power distribution system configured to provide voltage regulation, according to aspects of the present specification.

Turning now to the drawings, by way of example in FIG. 1, a diagrammatical representation 100 of a power distribution system configured to provide a desired value of voltage regulation, according to aspects of the present specification, is presented. In a presently contemplated configuration, the power distribution system 100 includes a power grid 102, a transformer 104, a distribution feeder 106, a plurality of distribution sub-feeders 107, a photovoltaic panel 114, a load 112, and a controller 126.

Also, in one example, the transformer 104 is a medium voltage to low voltage transformer. Accordingly, the transformer 104 is configured to convert a medium voltage input received from the power grid 102 to a low voltage output. The transformer 104 may include an off-load tap changer, an on-load tap changer, or a tap-less transformer.

The power grid 102 may be a medium voltage grid or a high voltage grid. In one example, the high voltage may have a value of about 30 kV and higher. Also, the medium voltage may have a value in a range from about 1 kV to about 30 kV. The low voltage may have a value of about 1 kV and lower.

The loads 112 may include residential houses/apartments, electrical vehicles, and/or other loads. In one example, power may be provided to the load 112 from the power grid 102. Accordingly, in this example, the power grid 102 acts as a power source and the load 112 acts as a sink. The term 'power' as used herein, is used to refer to a product of voltage and current.

In certain embodiments, the photovoltaic panel 114 is coupled to the power grid 102 via the distribution feeder 106 and the distribution sub-feeders 107 and the power is provided from the photovoltaic panel 114 to the power grid 102. In this example, the photovoltaic panel 114 acts as a power source and the power grid 102 acts as a sink. Although the example of FIG. 1 depicts a photovoltaic panel 114 as being coupled to the distribution feeder 106, other power generation units, such as wind power generation systems and other renewable generation systems may also be employed.

Further, in one example, the distribution feeder 106 may include a plurality of conductors. In particular, the distribution feeder 106 may include three single phase conductors and a neutral conductor. The term 'single phase conductors' is used to refer to conductors configured to carry alternating current voltages that are offset in time by one-third of a time period. The neutral conductor may be coupled to a ground point, in one embodiment. Accordingly, the neutral conductor may also be referred to as a ground or an earth conductor.

Moreover, the system 100 includes a plurality of modular voltage regulation units 110 distributed along the distribution feeder 106. In particular, the modular voltage regulation units 110 are coupled to the distribution feeder 106 at different locations along the distribution feeder 106. In one example, the plurality of modular voltage regulation units 110 is coupled to one another in series. The modular voltage regulation units 110 may be coupled to each other via the phase conductors and the neutral conductor corresponding to the distribution feeder 106. The term "coupled," as used herein, includes wired coupling, wireless coupling, electrical coupling, magnetic coupling or combinations thereof.

Reference numeral 109 is generally representative of this coupling of the modular voltage regulation units 110. In one example, the coupling 109 of the modular voltage regulation units 110 is achieved by using a distribution feeder 106. One example of coupling the modular voltage regulation units 110 to one another will be described in greater detail with reference to FIGS. 10 and 11. Furthermore, in accordance with aspects of the present specification, two or more modular voltage regulation units 110 may be coupled to the distribution feeder 106 at the same location. In this example, the two or more modular voltage regulation unit 110 may be coupled directly to each other in series.

In one embodiment, the modular voltage regulation units 110 are disposed in one or more distribution casings 108. Accordingly, each distribution casing 108 may include one or more modular voltage regulation units 110. In one example, if two or more modular voltage regulation units 110 are disposed in a single distribution casing 108, these modular voltage regulation units 110 may be directly coupled to each other in series. The arrangement of the modular voltage regulation units 110 in the distribution casing 108 will be described in greater detail with respect to FIG. 2. Also, the modular voltage regulation units 110 that are distributed along the distribution feeder 106 may be communicatively coupled to one another via use of a communication channel 113.

Furthermore, each of the modular voltage regulation units 110 is configured to provide a desired value of voltage regulation. Accordingly, the modular voltage regulation units 110 aid in maintaining a voltage profile along the distribution feeder 106 within a desirable range. In particular, use of the modular voltage regulation units 110 aids in maintaining a relatively flatter voltage profile along the distribution feeder 106 and thereby optimizes the voltage profile along the distribution feeder 106. The term 'flatter voltage profile' is used to refer to a voltage profile without significant deviations. Furthermore, the modular voltage regulation units 110 aid in circumventing violations of the voltage along the distribution feeder 106 beyond allowed bounds. In one example, allowed bounds entails that the maximum voltage deviation from a nominal voltage along the distribution feeder 106 should not exceed ±10% of the nominal voltage. It may be noted that the nominal voltage in low voltage distribution grids in Europe is 230 V, with a variance of ±10%. Also, in North America, the nominal voltage in low voltage distribution grids is 120 V, with a variance allowed from 114 V to 126 V (±5%). Different examples of circumventing voltage violations along the distribution feeder 106 and maintaining a flatter voltage profile along the distribution feeder 106 are described in greater detail with respect to FIGS. 8 and 9.

In a presently contemplated configuration, the modular voltage regulation unit 110 includes at least one switch and a transformer. The switch may be an electric switch, a semiconductor switch, a controllable switch, a non-controllable switch, a solid state electronic switch, and the like. Different embodiments of the modular voltage regulation units will be described in greater details with respect to FIGS. 3-7.

Furthermore, the controller 126 is configured to control operation of the modular voltage regulation units 110. In particular, the controller 126 is coupled to the switches in the modular voltage regulation units 110 and configured to control switching of the switches in the modular voltage regulation units 110. The term 'switching' is used to refer to an activation and deactivation of the switches. Also, the term 'activation' of the switches, as used herein, refers to transitioning the switch to an 'ON' state to provide a closed circuit conducting path. The term 'deactivation' of the switches, as used herein, refers to transitioning the switch to an 'OFF' state to provide an open circuit non-conducting path.

In certain embodiments, the controller 126 includes a processing subunit 128 and an electrical parameter sensing subunit 130. The electrical parameter sensing subunit 130 may be configured to measure a current, a voltage, power, and the like, at inputs and/or outputs of the modular voltage regulation units 110 or any location along the distribution feeder 106, in one example.

The processing subunit 128 in turn may include a microcontroller, a microprocessor, a computer, or combinations thereof. In one example, the processing subunit 128 may be configured to compare a voltage of the modular voltage regulation unit 110 or a voltage at any location along the distribution feeder 106 to a determined threshold for a determined period of time. Further, the processing subunit 128 may aid in determining a desired value of voltage regulation to be provided at a specific location along the distribution feeder 106 based on the comparison. Moreover, the processing subunit 128 may aid in determining an operating mode of the modular voltage regulation units 110, and in particular, an operating mode of a transformer in the modular voltage regulation unit 110. The operating mode of the transformer in the modular voltage regulation unit 110 may be determined based on a switching pattern of the switches in the modular voltage regulation unit 110. The comparison of the voltage at any location along the distribution feeder 106 to the determined threshold will be described in greater detail with respect to FIGS. 8 and 12.

Figure 2:
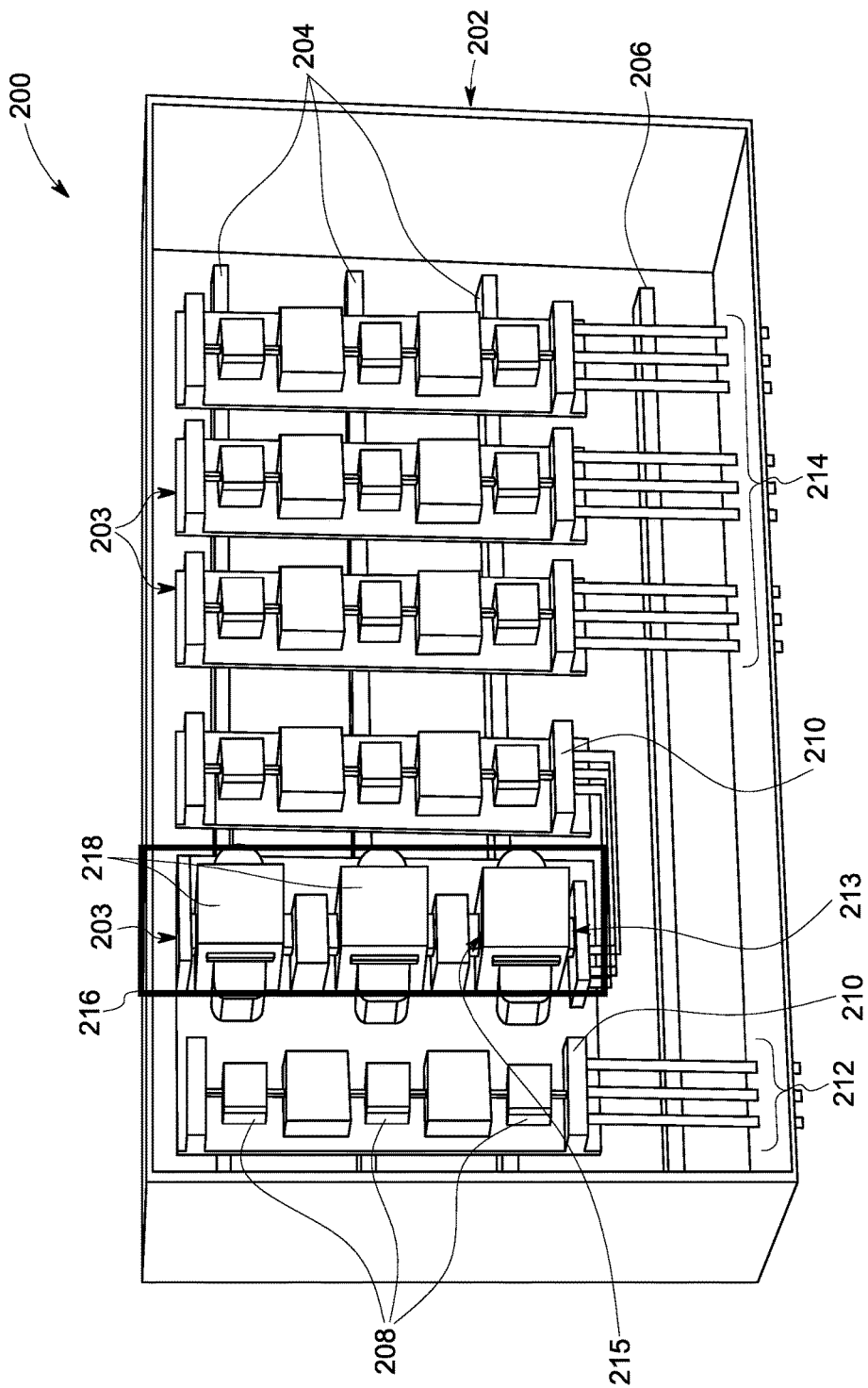
FIG. 2 is a diagrammatical representation of a distribution casing having modular voltage regulation units configured for use in the power distribution system of FIG. 1, according to aspects of the present specification.

As previously noted with reference to FIG. 1, the modular voltage regulation units 110 may be disposed in a distribution casing. FIG. 2 is a diagrammatical representation 200 of a distribution casing configured for use in the power distribution system 100 of FIG. 1. In the example of FIG. 2, the distribution casing 200 is configured to house a three-phase modular voltage regulation unit 216.

The distribution casing 200 includes a housing 202. The housing 202 may be a cabinet/enclosure configured to receive power from a power source and distribute the power to loads located at one or more locations. Furthermore, the distribution casing 200 includes a plurality of racks 203 configured to securely hold the modular voltage regulation units 218. In certain embodiments, the distribution casing may also include one or more doors that aid in enclosing a space inside the distribution casing 200. Additionally, the doors may also aid in protecting the components disposed in the distribution casing 200 from external forces, such as dust, wind, ice, and the like.

In addition, the distribution casing 200 includes a busbar. The busbar may be a horizontal busbar or a vertical busbar. In the example of FIG. 2, reference numeral 204 represents three horizontal busbars, where each horizontal busbar 204 corresponds to a phase conductor of the three phase conductors. Also, reference numeral 206 represents a horizontal busbar corresponding to the neutral conductor. The distribution casing 200 also includes a plurality of cable connectors 210.

Furthermore, in the example of FIG. 2, the distribution casing 200 is shown as including two sets of conductors 212, 214. The first set of conductors 212 represents incoming conductors and the second set of conductors 214 represent outgoing conductors in the distribution casing 200. The incoming conductor is a conductor entering from an upstream end of the power distribution system 100 (see FIG. 1) and the outgoing conductor is a conductor exiting to a downstream end of the power distribution system 100. In one example, the upstream end of the power distribution system 100 is located closer to the power grid 102 (see FIG. 1), and the downstream end of the power distribution system 100 is farther from the power grid 102.

In one embodiment, the incoming and outgoing conductors 212, 214 may be a portion of a distribution feeder, such as the distribution feeder 106 of FIG. 1. In a three-phase power distribution system, the incoming and the outgoing may each include at least one single phase conductor and a neutral conductor. The first and second sets of conductors 212, 214 are operatively coupled to the cable connectors 210.

Moreover, the distribution casing 200 may also include one or more fuse rails. The fuse rails are mechanically coupled either directly to the housing 202 or to one or more of the horizontal busbars 204, 206. Furthermore, the distribution casing 200 may also include one or more fuse bases 208. In certain embodiments, these fuse bases 208 are mounted on the fuse rails and are configured to support/house an associated fuse. Also, a horizontal busbar 204 is coupled to one end of each fuse base 208, while the cable connectors 210 are coupled to the other end of each fuse base 208. In certain embodiments, a fuse base 208 may be devoid of a fuse. In another embodiment, an insulating link may be disposed on the fuse base 208 to electrically insulate the corresponding cable connector 210 from the horizontal busbars 204, 206.

For ease of illustration, the distribution casing 200 is shown as including three modular voltage regulation units 218. In particular, the modular voltage regulation units 218 are mechanically coupled to the racks 203. In some embodiments, the MVRUs 218 may be operatively coupled to the racks 203 via use of fastening means, such as, but not limited to, screws, clamps, and the like. The racks 203 holding the modular voltage regulation units 218 are mechanically coupled to the distribution casing 200 or the horizontal busbars 204, 206.

In the example of FIG. 2, each modular voltage regulation unit 218 is a single phase modular voltage regulation unit. Accordingly, the three single phase modular voltage regulation units 218 may in combination form a three-phase modular voltage regulation unit 216. In the example of FIG. 2, the three-phase modular voltage regulation unit 216 may include a combination three single phase modular voltage regulation units 218. In an alternative embodiment, the three-phase modular voltage regulation unit 216 may be representative of a three phase modular voltage regulation unit having a single three phase transformer, one or more controllers, and a set of switches corresponding to each of the three phases. The controller may be configured to control operation of the switches corresponding to the modular voltage regulation units 218. In one example, the controller may be an integral part of the single phase modular voltage regulation unit 218. In another example, the controller may be external to the single phase modular voltage regulation unit 218. In yet another example, a centralized controller may be employed to control operations corresponding to the single phase modular voltage regulation unit 218.

Furthermore, in certain embodiments, each of the modular voltage regulation units 218 may include a corresponding first terminal 213 and a second terminal 215. The first terminals 213 may be representative of an input terminal, while the second terminals 215 may be representative of an output terminal of the modular voltage regulation units 218. Moreover, in the example of FIG. 2, the first terminals 213 of the modular voltage regulation units 218 are coupled to the cable connector 210 of the first set of conductors 212. Also, the second terminals 215 of the modular voltage regulation units 218 are coupled to the horizontal busbars 204, 206.

In the example of FIG. 2, a single modular voltage regulation unit 218 is coupled to each of the horizontal busbars 204. It may be noted that the two or more modular voltage regulation units may be coupled to each other directly in series. The term 'directly' as used herein, refers to a coupling of the two or more modular voltage regulation units using the horizontal busbars. Furthermore, in this example, the modular voltage regulation units that are directly coupled to one another may be disposed in a single distribution casing.

Figure 3:
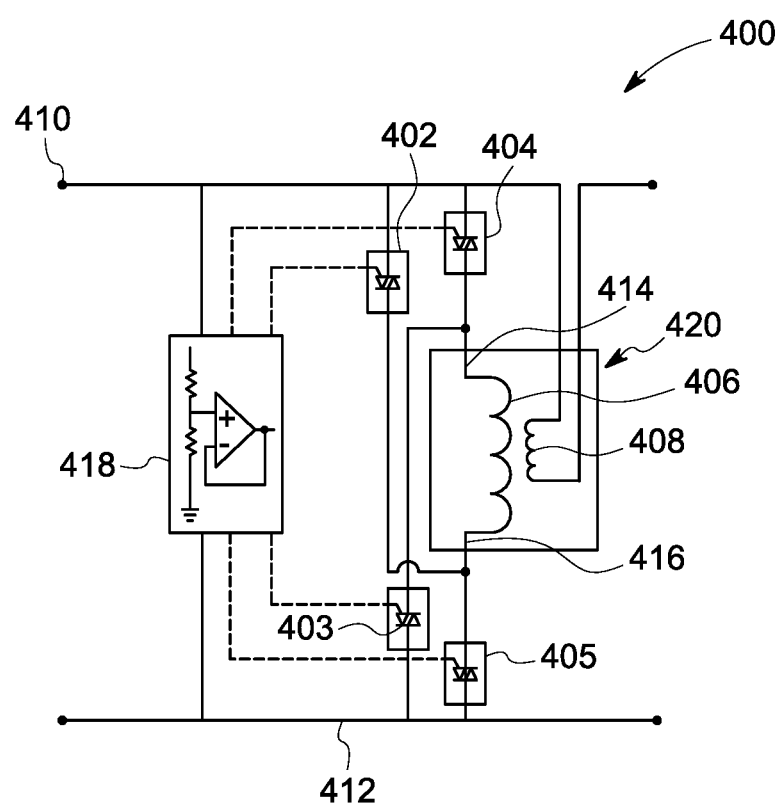
FIG. 3 is a diagrammatical representation of one embodiment of a modular voltage regulation unit for use in the power distribution system of FIG. 1, according to aspects of the present specification.

Turning now to FIG. 3, a diagrammatical representation 400 of one embodiment of a modular voltage regulation unit for use in the power distribution system 100 of FIG. 1, according to aspects of the present specification, is depicted. The modular voltage regulation unit 400 includes a transformer 420. In one embodiment, the transformer 420 is a tap-less transformer. Also, the transformer 420 may be a single phase transformer or a three phase transformer. In one example, the transformer 420 is a two winding transformer. The two-winding transformer may be operated as an auto-transformer.

The two windings of the transformer 420 include a primary winding 406 and a secondary winding 408. Also, the primary winding 406 of the transformer 420 has a first end 414 and a second end 416. In one embodiment, the primary winding 406 may be rated for a nominal voltage and the secondary winding 408 may be rated for a fraction of the nominal voltage. By way of example, the secondary winding 408 is rated for a voltage in a range from about 0.5% to about 5% of the nominal voltage. In another example, the secondary winding 408 is rated based on a rated load current in the distribution feeder, such as the distribution feeder 106 of FIG. 1, while the primary winding 406 is rated at a fraction of the rated load current in the distribution feeder. In particular, the primary winding 406 may be rated for a current in a range from about 0.5% to about 5% of the rated load current.

In addition, the modular voltage regulation unit 400 includes a controller 418 and switches 402, 403, 404, and 405. In one embodiment, the switches 402, 403, 404, 405 are a triode for alternating current (TRIAC). In another example, the switches 402, 403, 404, 405 may include electrical switches, solid state electronic switches, semiconductor switches, or combinations thereof.

Reference numeral 410 is representative of a phase conductor. Further, reference numeral 412 represents a neutral conductor. In the example of FIG. 3, when the two-winding transformer 420 is operated as an auto-transformer, the primary winding 406 is coupled in parallel between the phase conductor 410 and the neutral conductor 412 and the secondary winding 408 in coupled in series with the phase conductor 410.

In one example, the modular voltage regulation unit 400 may configured to provide one or more desired values of voltage regulation. The desired values of voltage regulation may have a corresponding magnitude and polarity. In one example, the polarity of the desired values of voltage regulation may include positive values or negative values. Furthermore, the polarity of the voltage regulation is determined based on a switching pattern of the switches 402, 403, 404, 405. The term 'switching pattern,' as used herein, refers to a pattern based on which a combination of the switches 402, 403, 404, 405 is activated or deactivated.

In certain embodiments, the modular voltage regulation unit 400 may include a single switch. In this example, the switching pattern may be a switching state of the single switch. However, when the modular voltage regulation unit 400 includes multiple switches, the switching pattern may be a combination of switching states of the multiple switches.

The magnitude of voltage regulation provided by the modular voltage regulation unit 400 is dependent on the turns ratio of the transformer 420. Accordingly, in one example, if the turns ratio of the transformer 420 is 100:2, then the desired values of voltage regulation provided by the modular voltage regulation unit 400 are +2%, −2%, or 0%. In another example, if the turns ratio of the transformer 420 is 100:1, then the desired values of voltage regulation of +1%, −1%, or 0% may be achieved by employing the modular voltage regulation unit 400. Some examples of the desired values of voltage regulation provided by the modular voltage regulation unit 400 include 0%, +1%, −1%, +2%, and −2% of a voltage along the distribution feeder.

Furthermore, the transformer 420 may be operated in a step-up mode (boost mode) or a step-down mode (buck mode) by reversing the coupling of the primary winding 406 between phase conductor 410 and neutral conductor 412. The transformer 420 may also be operated in a neutral mode when the primary winding 406 is short circuited. It may be noted that the output voltage corresponding to the neutral mode is neither stepped-up nor stepped-down. Hence, in the neutral mode of operation of the transformer 420, the output voltage is equal to the input voltage. Accordingly, based on the operating mode of the transformer 420, the modular voltage regulation unit 400 may have three modes of operations, such as the step-up mode, the step-down mode, and the neutral mode of operation.

In the example of FIG. 3, the transformer 420 is operated in the step-up (boost) mode when switches 404, 405 are in an activated condition and the switches 402, 403 are in a deactivated condition. Accordingly, the first end 414 of the primary winding 406 is coupled to the phase conductor 410 and the second end 416 of the primary winding 406 is coupled to the neutral conductor 412. In this example, a +2% voltage regulation may be obtained.

Further, the transformer 420 is operated in step-down (buck) mode when switches 402, 403 are in an activated condition and switches 404, 405 are in a deactivated condition. Accordingly, the first end 414 of the primary winding 406 is coupled to the neutral conductor 412 and while the second end 416 of the primary winding 406 is coupled to the phase conductor 410. Therefore, a −2% voltage regulation may be obtained.

Moreover, the transformer 420 is operated in the neutral mode when the primary winding 406 is short circuited. The primary winding 406 is short circuited when the switches 402, 404 are in an activated condition and the switch 403, 405 are in a deactivated condition. In another example, the primary winding 406 may be short circuited when the switches 403, 405 are in an activated condition and the switches 402, 404 are in a deactivated condition. Since the output voltage in the neutral mode is neither stepped-up nor stepped-down when the primary winding 406 is short circuited, the voltage regulation provided by the modular voltage regulation unit 400 is 0%.

In certain scenarios, a higher percentage of voltage regulation may be desired. For example, in some situations voltage regulation of ±4% may be desired. In such scenarios, two or more modular voltage regulation units 400 may be connected in series inside a single distribution casing to achieve the desired higher values of voltage regulation. The modular voltage regulation units may be installed in the distribution casing based on space available within the distribution casing. In one example, for obtaining the ±4% voltage regulation, four modular voltage regulation units 400, where each modular voltage regulation units is configured to provide ±1% voltage regulation may be employed. In another example, two modular voltage regulation units 400 where each modular voltage regulation units is configured to provide ±2% may be coupled in series. In accordance with exemplary aspects of the present specification, a value of voltage regulation that is higher than the value of voltage regulation corresponding to the individual modular voltage regulation unit 400 may be achieved by altering the number of modular voltage regulation units 400 in the distribution casing.

Furthermore, the size of the transformer 420 corresponding to each of the modular voltage regulation units 400 is defined based on the value of voltage regulation the modular voltage regulation unit is configured to provide and a rated load current. It may be noted that the value of voltage regulation and the rated load current may decrease towards a downstream end of the distribution feeder.

Although in the example of FIG. 3, the controller 418 is depicted as being integral to the modular voltage regulation unit 400, in another embodiment, the controller 418 may be external to the modular voltage regulation unit 400. Furthermore, although in the example of FIG. 3 the modular voltage regulation unit is depicted as having four switches, modular voltage regulation units having any other number of switches may also be used. Also, the example of FIG. 3 provides a modular voltage regulation unit 400 configured to provide three values of voltage regulation, that is, a positive, negative and zero values of voltage regulation. However, in another embodiment, the modular voltage regulation unit 400 may be configured to provide other values of voltage regulation. The different embodiments of the modular voltage regulation units will be described in greater detail with respect to FIGS. 4-7.

Figure 4:
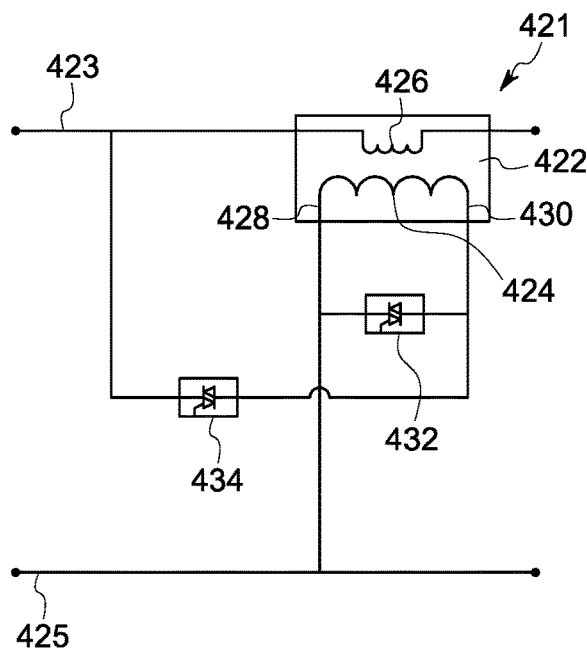
FIGS. 4-7 are diagrammatical representations of other embodiments of a modular voltage regulation unit for use in the power distribution system of FIG. 1, according to aspects of the present specification.
Figure 5:
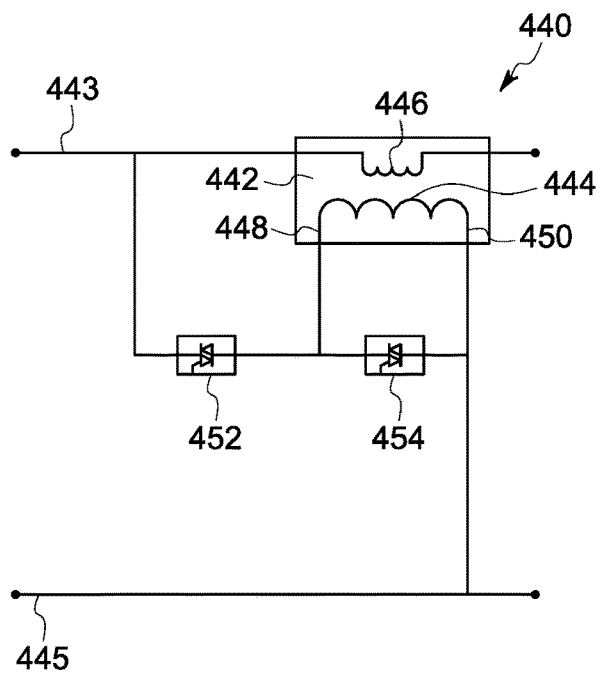

FIGS. 4 and 5 are diagrammatical representations 421, 440 of other embodiments of a modular voltage regulation unit for use in the power distribution system 100 of FIG. 1, according to aspects of the present specification. In particular, FIGS. 4 and 5 represent modular voltage regulation units 421, 440 having two switches.

FIG. 4 represents a modular voltage regulation unit 421 that include a transformer 422 and two switches 432, 434. Reference numeral 423 represents a phase conductor, such as a phase conductor corresponding to a horizontal busbar or a distribution feeder and reference numeral 425 represents a neutral conductor, such as a neutral conductor corresponding to a horizontal busbar or a distribution feeder. The transformer 422 includes a primary winding 424 and a secondary winding 426. In the example of FIG. 4, turns ratio of the transformer 422 is 100:2. The primary winding 424 has a first end 428 and a second end 430. The secondary winding 426 is coupled in series with the phase conductor 423.

The switch 432 is coupled across the first and second ends 428, 430 of the primary winding 424. Further, the first end 428 is coupled to the neutral conductor 425 and the second end 430 is coupled to the phase conductor 423 via the switch 434. When the switch 432 is activated, the primary winding 424 may be short circuited.

The transformer 422 is operated in a neutral mode when the primary winding 406 is short circuited. Accordingly, the modular voltage regulation unit 421 may be operated in a neutral mode. The voltage regulation provided by the modular voltage regulation unit 421 in the neutral mode is 0%.

Furthermore, when the switch 434 is activated and the switch 432 is deactivated, the second end 430 of the primary winding 424 is coupled to the phase conductor 423. Accordingly, the transformer 422 operates in a step-down mode. In this example, the modular voltage regulation unit 421 operates in a step-down mode and provides a voltage regulation of −2%.

FIG. 5 represents the modular voltage regulation unit 440 that includes a transformer 442 and switches 452, 454. The transformer 442 has a primary winding 444 and a secondary winding 446. In the example of FIG. 5, turns ratio of the transformer 442 is 100:2. The primary winding 444 has a first end 448 and a second end 450. Reference numeral 443 represents a phase conductor and reference numeral 445 represents a neutral conductor. The secondary winding 446 is coupled in series with the phase conductor 443. Further, the switch 452 is coupled between the first end 448 of the primary winding 444 and the phase conductor 443. The switch 454 is coupled across the first end 448 and the second end 450 of the primary winding 444. Also, the second end 450 of the primary winding 444 is coupled to the neutral conductor 445.

When the switch 454 is activated, the primary winding 444 may be short circuited. In this situation, the transformer 442 is operated in a neutral mode. Accordingly, the modular voltage regulation unit 440 may be operated in the neutral mode. The voltage regulation provided by the modular voltage regulation unit 440 in the neutral mode is 0%. Also, when the switch 452 is activated and the switch 454 is deactivated, the first end 448 of the primary winding 444 is coupled to the phase conductor 443. Accordingly, the transformer 442 operates in a step-up mode. In this example, the modular voltage regulation unit 440 operates in a step-up mode and provides a voltage regulation of +2%.

Figure 6:
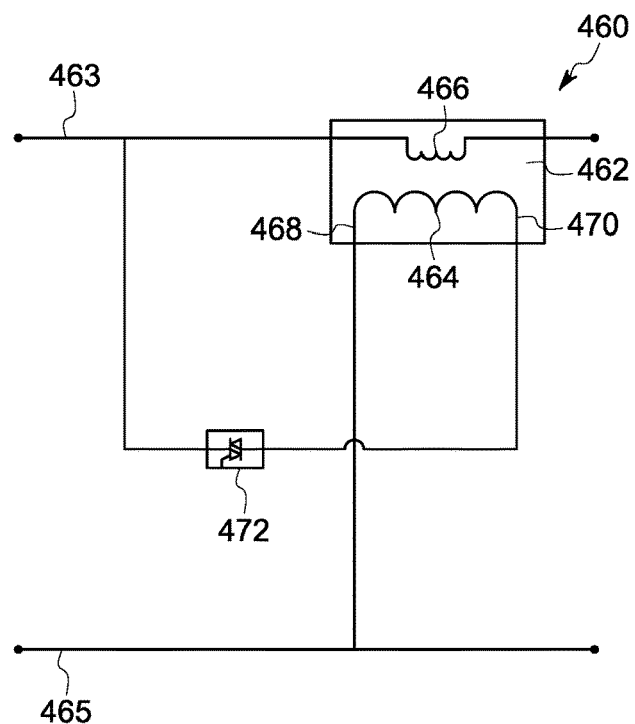
Figure 7:
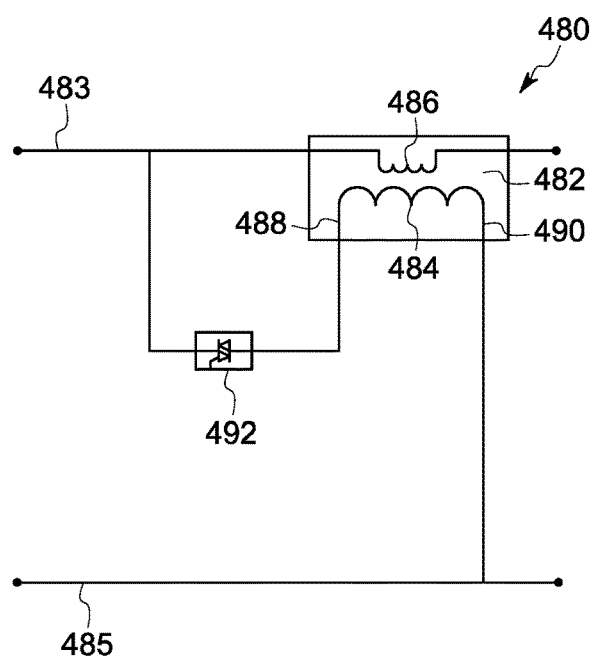

FIGS. 6 and 7 are diagrammatical representations 460, 480 of other embodiments of a modular voltage regulation unit for use in the power distribution system 100 of FIG. 1, according to aspects of the present specification. In particular, FIGS. 6 and 7 represent modular voltage regulation units 460, 480 having a single switch.

FIG. 6 represents a modular voltage regulation unit 460 that includes a transformer 462 and a switch 472. The transformer 462 includes a primary winding 464 and a secondary winding 466. In the example of FIG. 6, turns ratio of the transformer 462 is 100:2. The primary winding 464 has a first end 468 and a second end 470. Reference numeral 463 represents a phase conductor and reference numeral 465 represents a neutral conductor. The switch 472 is coupled between the second end 470 of the primary winding 464 and the phase conductor 463. The first end 468 of the primary winding 464 is coupled to the neutral conductor 465.

When the switch 472 is deactivated, the modular voltage regulation unit 460 is configured to provide 0% voltage regulation. However, when the switch 472 is activated, the second end 470 of the primary winding 464 is coupled to the phase conductor 463. Accordingly, the transformer 462 operates in a step-down mode. Therefore, the modular voltage regulation unit 460 operates in the step-down mode and provides a voltage regulation of −2%.

FIG. 7 represents a modular voltage regulation unit 480 that includes a transformer 482 and a switch 492. The transformer 482 includes a primary winding 484 and a secondary winding 486. In the example of FIG. 7, turns ratio of the transformer 482 is 100:2. The primary winding 484 has a first end 488 and a second end 490. Reference numeral 483 represents a phase conductor and reference numeral 485 represents a neutral conductor. The switch 492 is coupled between the first end 488 of the primary winding 484 and the phase conductor 483. The second end 490 of the primary winding 484 is coupled to the neutral conductor 485.

When the switch 492 is in a deactivated state, the modular voltage regulation unit 480 is configured to provide 0% voltage regulation. However, when the switch 492 is activated, the first end 488 of the primary winding 484 is coupled to the phase conductor 483. Accordingly, the transformer 482 operates in a step-up mode. Therefore, the modular voltage regulation unit 480 operates in the step-up mode and provides a voltage regulation of +2%.

Figure 8:
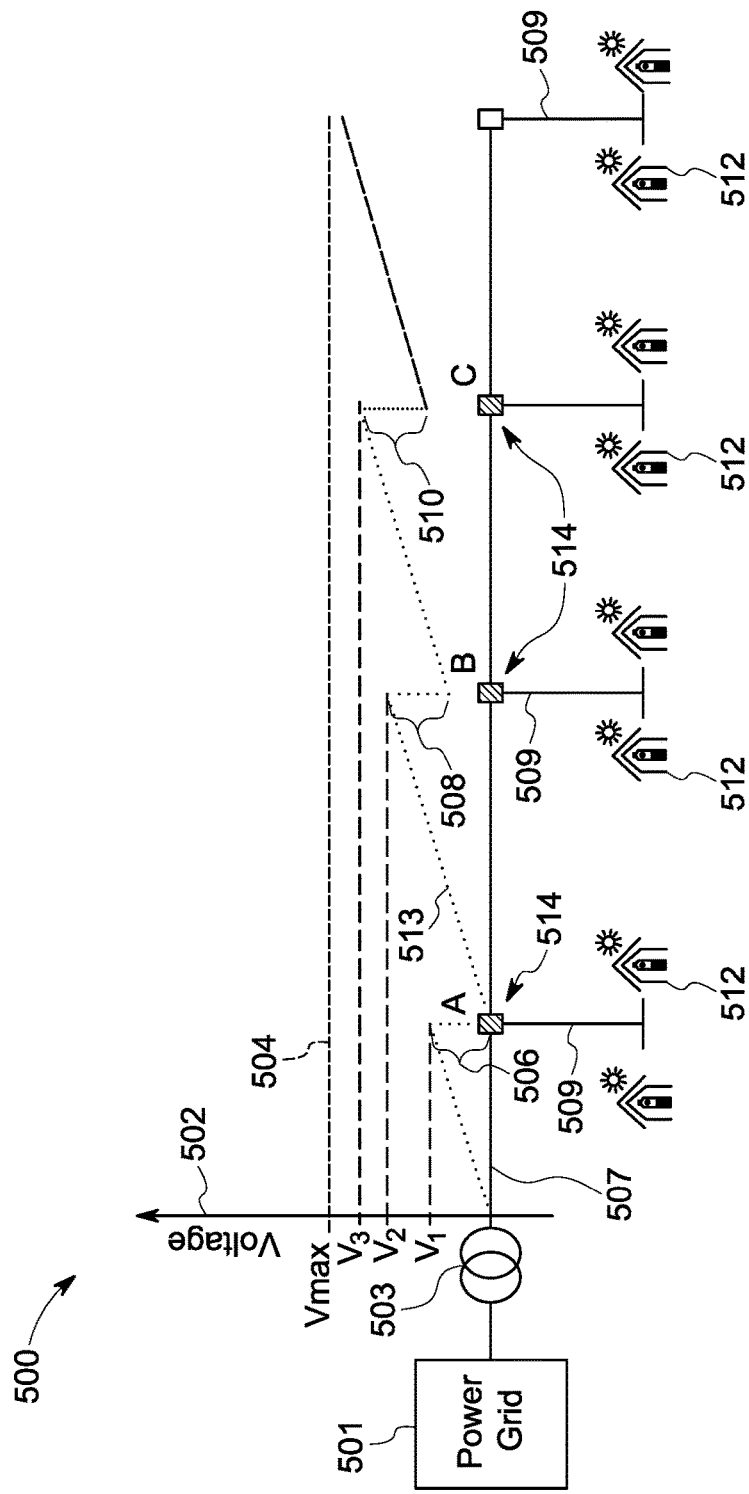
FIG. 8 is a diagrammatical representation of a voltage profile along a distribution feeder of the power distribution system of FIG. 1, according to aspects of the present specification.

FIG. 8 is a diagrammatical representation 500 of a voltage profile along the distribution feeder 106 of the power distribution system 100 of FIG. 1, according to aspects of the present specification. As noted hereinabove, the term 'voltage profile' is used to refer to a voltage along a length of the distribution feeder 106. It is desirable to have a relatively flat voltage profile along the distribution feeder.

In the example of FIG. 8, a voltage profile 513 along a distribution feeder 507 is depicted. Additionally, a power grid 501, a transformer 503, distribution sub-feeders 509, photovoltaic panels 512, and modular voltage regulation units 514 are depicted along with the voltage profile. In one embodiment, the photovoltaic panels 512 are configured to provide power to the power grid 501 via the distribution feeder 507. In this scenario, the power grid 501 acts as a sink and the photovoltaic panels 512 act as a source.

Furthermore, points A, B, C represents different locations along the distribution feeder 507. The photovoltaic panels 512 are coupled to the points A, B, and C. In this example, power may be provided to the distribution feeder 507 at points A, B, and C from the photovoltaic panels 512 via corresponding distribution sub-feeders 509. Therefore, the voltage downstream of points A, B, and C may increases. Consequently, the voltage along the distribution feeder 507 may deviate beyond a maximum voltage $V_{max}$ 504. In order to regulate the voltage along the distribution feeder 507, modular voltage regulation units 514 are disposed along the distribution feeder 507. In the example of FIG. 8, a modular voltage regulation unit 514 is coupled to the distribution feeder 507 at each of the points A, B, C. In one example, the modular voltage regulation units 514 may be coupled in series to one another. The modular voltage regulation units 514 may be disposed in one or more distribution casings, in one embodiment.

Reference numeral 502 represents a y-axis that depicts voltage along the distribution feeder 507. In the example of FIG. 8, the voltage at point A along the distribution feeder 507 is $V_1$. The modular voltage regulation unit 514 coupled at point A is configured to regulate the voltage at point A. To that end, the modular voltage regulation unit 514 compares the voltage $V_1$ to a determined threshold corresponding to point A. In accordance with aspects of the present specification, the voltage $V_1$ is compared to the corresponding determined threshold for a determined period of time in order to avoid any false alarms. The determined threshold includes a range of values around a determined set point of voltage. In particular, the determined threshold includes a dead band around the determined set point of voltage. Accordingly, the determined threshold may have a corresponding upper band and lower band of voltages. The term 'determined set point of voltage' is used to refer to a single determined value of reference voltage. In one example, the determined set point of voltage may be $V_a$ volts and the determined threshold may be a range of values from about $(V_a+\Delta V)$ volts to about $(V_a-\Delta V)$ volts.

Further, in accordance with aspects of the present specification, if the measured voltage deviates from the determined threshold for a period that exceeds the determined period of time, then a need for voltage regulation may be established. In one example, if the deviation of the voltage $V_1$ at point A from the corresponding determined threshold is sustained for a period that exceeds the determined period of time, then the modular voltage regulation unit 514 may switch from a current operating mode to a different operating mode in order to reduce the value of the voltage along the distribution feeder 507 at point A. If at that instant of time the modular voltage regulation unit 514 is in a neutral mode, the modular voltage regulation unit 514 may transition to a step-down mode. In another example, if at that instant of time the modular voltage regulation unit 514 is in a step-up mode, the modular voltage regulation unit 514 may transition to the neutral mode. In yet another example, if at that instant of time the modular voltage regulation unit 514 is already in the step-down mode, it may be noted that no further voltage reduction by the modular voltage regulation unit 514 coupled at point A may be achieved.

Based on the operating mode, an appropriate switching pattern of one or more switches that facilitates transitioning of the modular voltage regulation unit 514 to a desired operating mode is determined. In the example of FIG. 8, the voltage at the point A may be reduced from $V_1$ by a value represented by reference numeral 506. Consequent to this reduction in voltage at the point A, the voltage downstream of the point A may also be reduced.

Similarly, based on a comparison of a voltage $V_2$ at point B with a corresponding determined threshold, a desired operating mode of the modular voltage regulation unit 514 coupled at point B is determined to modify the voltage along the distribution feeder 507 at point B. In one example, the modular voltage regulation unit 514 is switched from a neutral mode to a step-down mode, and the voltage along the distribution feeder 507 at point B is reduced by a value represented by reference numeral 508. In a similar manner, the modular voltage regulation unit 514 at point C is switched from a neutral mode to a step-down mode, and the voltage along the distribution feeder 507 at point C is reduced by a value represented by reference numeral 510. In the example of FIG. 8, the turns ratio between the primary and secondary transformer windings of the modular voltage regulation units 514 at points A, B and C are 100:1. Therefore, the value of voltage regulation represented by each of the reference numerals 506, 508, and 510 is −1%. In another example, the value of voltage regulation provided by the modular voltage regulation units 514 may be ±2.5%, ±2%, ±1.5%, ±0.75%, ±0.5%, or 0%.

Implementing the power distribution system having the modular voltage regulation units in one or more distribution casings as described with reference to FIG. 8 ensures that the voltage at any point along the distribution feeder 507 does not deviate beyond the maximum voltage $V_{max}$ 504. Furthermore, consequent to the regulation of the voltage along a plurality of points along the distribution feeder 507, the voltage profile 513 along the distribution feeder 507 has a relatively flatter profile.

In another example, a communication channel, such as the communication channel 113 of FIG. 1, may be employed to communicatively couple the modular voltage regulation units 514. The modular voltage regulation units 514 located at different points A, B, and C along the distribution feeder 507 may communicate with each other via the communication channel to determine a desired operating mode of each of the modular voltage regulation units 514 to obtain an optimal voltage profile along the distribution feeder 507. Use of the communication channel facilitates enhanced accuracy in voltage regulation along the distribution feeder 507 and consequently, a coordinated operation of the modular voltage regulation units 514 is achieved. The coordinated operation may be achieved based on one or more measurements of voltage, current, and/or power at different locations along the distribution feeder 507.

Figure 9:
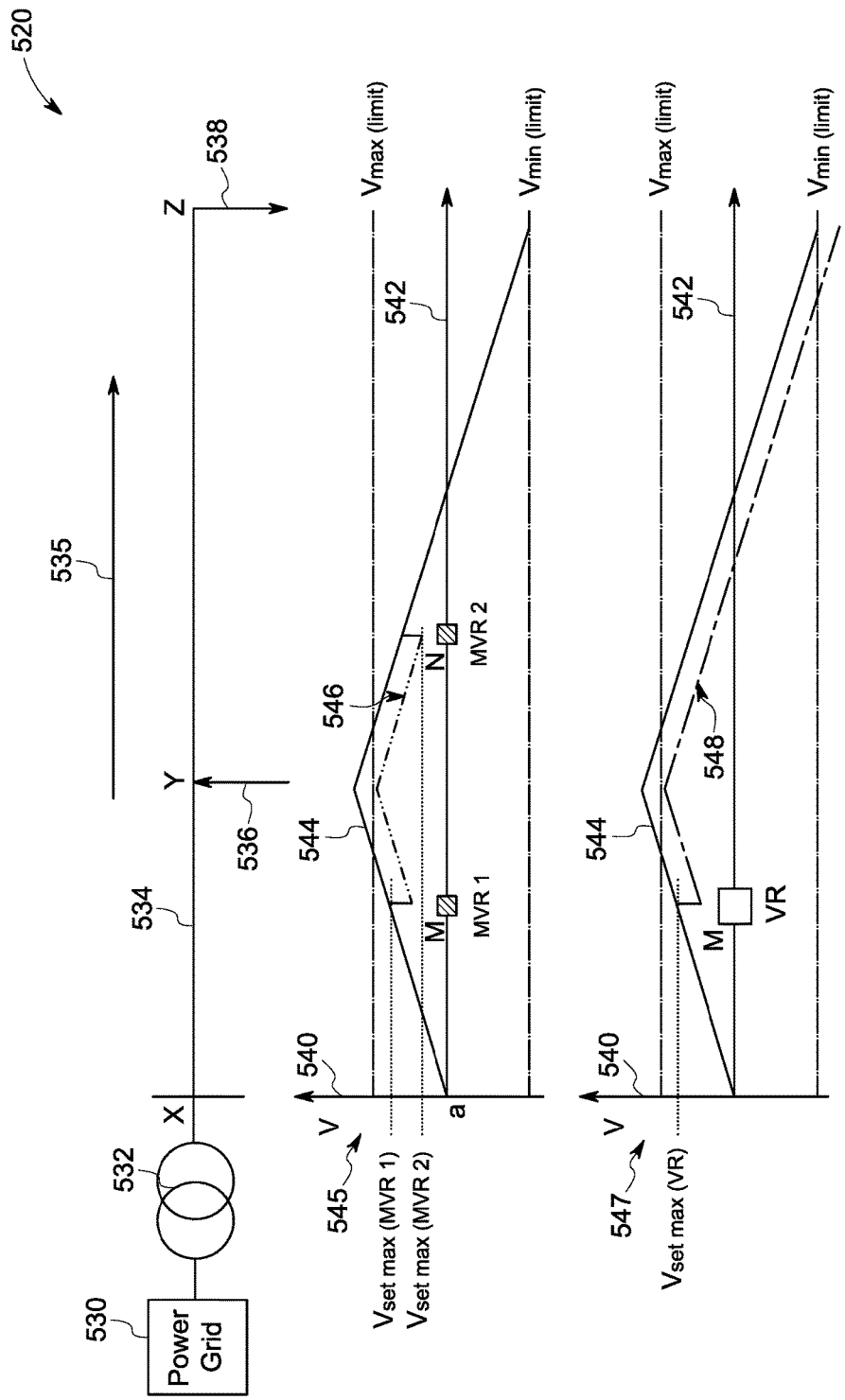
FIG. 9 is a diagrammatical representation of a comparison of the voltage profile along the distribution feeder of the power distribution system of FIG. 1 and a voltage profile of a conventional power distribution system.

FIG. 9 is a diagrammatical representation 520 of comparison of a voltage profile along the distribution feeder 106 of the power distribution system 100 of FIG. 1 and a voltage profile of a conventional power distribution system. It may be noted that the conventional power distribution system typically employs a voltage regulation device at only one location along a distribution feeder.

For ease of illustration, in FIG. 9, a power grid 530, a load 538, a distribution feeder 534, and a photovoltaic panel 536 are depicted along with the voltage profile of the exemplary power distribution system 100 and the voltage profile of the conventional power distribution system. In one scenario, power may be provided to the load 538 from the power grid 530. Accordingly, the power grid 530 acts as a power source and the load 538 acts as a sink. In another example, power is provided from the photovoltaic panel 536 to the power grid 530. In this example, the photovoltaic panel 536 acts as a power source and the power grid 530 acts as a sink.

Reference numeral 545 is representative of a voltage profile corresponding to the exemplary power distribution system 100 and reference numeral 547 is representative of a voltage profile of the conventional power distribution system. As previously noted, the exemplary power distribution system includes modular voltage regulation units coupled to a distribution feeder 534 at different locations along the distribution feeder 534. The modular voltage regulation units represented as $MVR_1$ and $MVR_2$ are coupled to the distribution feeder 534 at different locations along the distribution feeder 534. However, the conventional power distribution system includes only a single voltage regulation device VR coupled to the distribution feeder 534 at a single location. Reference numeral 535 is representative of a direction along the distribution feeder 534 from an upstream end X towards a downstream end Z.

Furthermore, reference numeral 540 represents a y-axis, indicating voltage along the distribution feeder 534 in volts and reference numeral 542 represents an x-axis indicating a position along the distribution feeder 534. Also, reference numeral 544 is indicative of a voltage along the distribution feeder 534 in the absence of any regulation. Further, $V_{max(limit)}$ indicates a maximum voltage along the distribution feeder 534 and $V_{min(limit)}$ indicates a minimum voltage along the distribution feeder 534.

The photovoltaic panel 536 is coupled at point Y along the distribution feeder 534 and the load 538 is coupled at point Z along the distribution feeder 534. The power may be provided from the photovoltaic panel 536 to the distribution feeder 534 and the power may be expended from the distribution feeder 534 at the load 538. Hence, the voltage at point Y has a higher value and the voltage at point Z has a lower value. In the example of FIG. 9, the voltage at point Y is higher than $V_{max(limit)}$ and the voltage at point Z is equal to or lower than $V_{min(limit)}$.

It may be noted that in the conventional power distribution system 547, the voltage regulation device VR is coupled to distribution feeder 534 only at point M. At point M, the voltage along the distribution feeder 534 is substantially equal to a determined threshold $V_{set\_max(VR)}$ corresponding to the voltage regulation device VR. Accordingly, the voltage regulation device VR may step-down the voltage along the distribution feeder 534 at point M and downstream of point M. However, due to power consumed by the load 538 coupled at point Z of the distribution feeder 534, the voltage along the distribution feeder 534 drops below the voltage $V_{min(limit)}$. Consequently, this arrangement of the voltage regulation device VR in the conventional power distribution system does not allow the conventional power distribution system to circumvent any voltage violations.

As depicted in FIG. 9, in the exemplary power distribution system 545, the modular voltage regulation units are coupled at multiple points along the distribution feeder 534 such as point M and point N. In particular, the modular voltage regulation unit $MVR_1$ is coupled to the distribution feeder 534 at point M, while the modular voltage regulation unit MVR$_2$ is coupled to the distribution feeder 534 at point N. The modular voltage regulation units MVR$_1$ and MVR$_2$ may be disposed in different distribution casings, in one example. Further, at point M, the voltage along the distribution feeder 534 is substantially equal to an upper band V$_{set\_max(MVR1)}$ of the determined threshold corresponding to modular voltage regulation unit MVR$_1$. The modular voltage regulation unit MVR$_1$ may be switched from one operating mode to another such that the voltage at point M drops by a desired value.

Further, at point N, the voltage along the distribution feeder 534 is substantially equal to a lower band V$_{set\_min(MVR2)}$ of the determined threshold corresponding to the modular voltage regulation unit MVR$_2$. The modular voltage regulation unit MVR$_2$ may be switched from one operating mode to another such that the voltage at point N is increased by a desired value. Consequently, the voltage profile 546 corresponding to the exemplary power distribution system is maintained between the V$_{max(limit)}$ and V$_{min(limit)}$ along the distribution feeder 534. The exemplary power distribution system 100 aids in circumventing any voltage violations along the distribution feeder 534.

Figure 10:
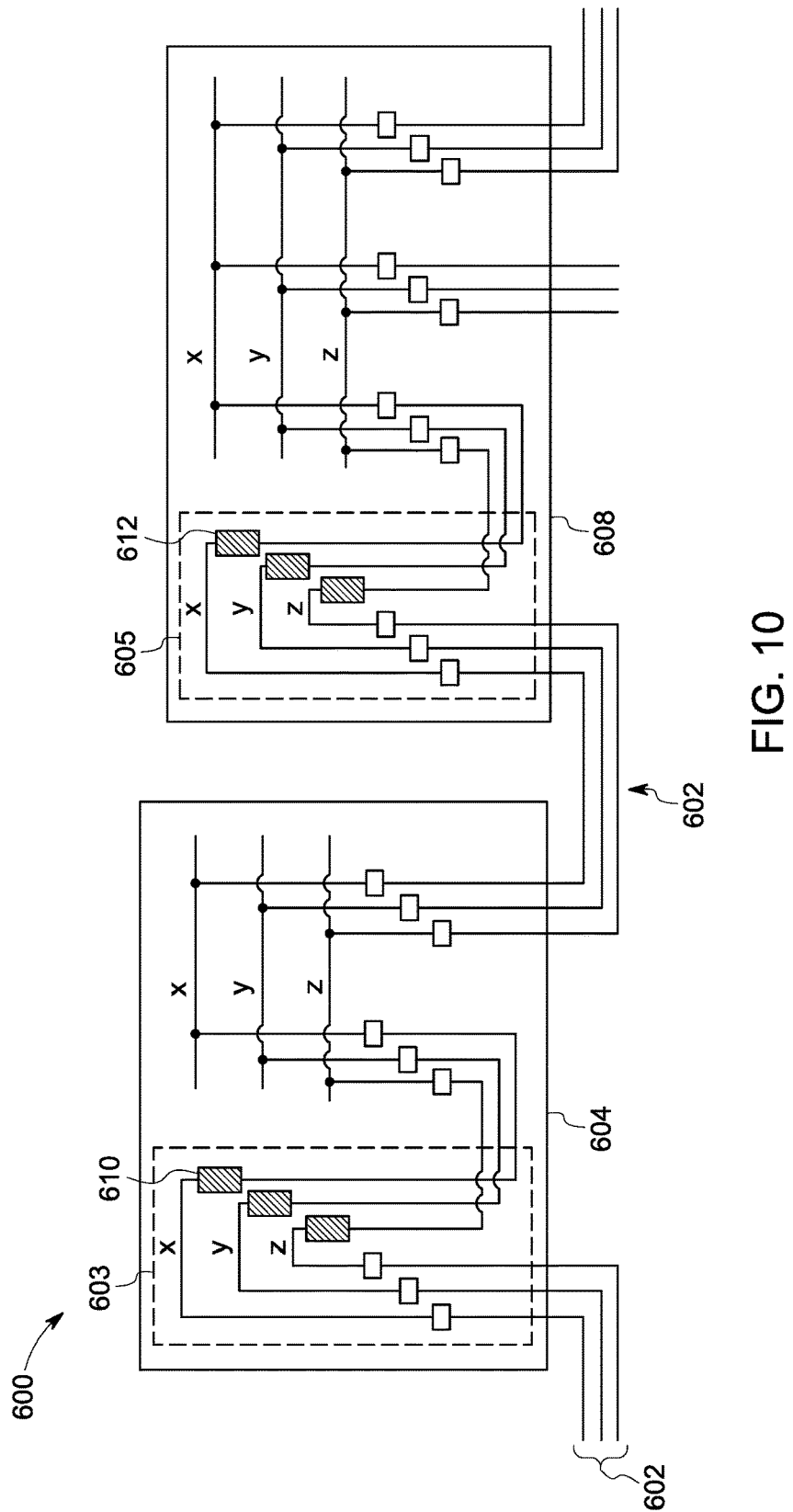
FIG. 10 is a diagrammatical representation of a series coupling between modular voltage regulation units of the power distribution system of FIG. 1, according to aspects of the present specification.

As previously noted with reference to FIG. 1, the one or more modular voltage regulation units may be coupled to one another as indicated by reference numeral 109. FIG. 10 is a diagrammatical representation 600 of one example of coupling between the modular voltage regulation units, such as the modular voltage regulation units 110 that are disposed along a distribution feeder, such as the distribution feeder 106. More particularly, FIG. 10 depicts a coupling between a set of modular voltage regulation units disposed in one distribution casing and another set of modular voltage regulation units disposed in another distribution casing.

Reference numeral 602 is representative of a distribution feeder 602, which in turn includes a set of conductors, such as the first and second sets of conductors 212, 214 of FIG. 3. Each set of conductors in turn includes three phase conductors corresponding to three phases and a neutral conductor, in one example.

As depicted in FIG. 10, a first set of modular voltage regulation units 610 is disposed in a first distribution casing 604 and a second set of modular voltage regulation units 612 is disposed in a second distribution casing 608. The first and second distribution casings 604, 608 are disposed at two different locations along the distribution feeder 602. By way of example, the first distribution casing 604 may be disposed at an upstream end of the distribution feeder 602, while the second distribution casing 608 may be disposed at a downstream end of the distribution feeder 602. In the example of FIG. 10, each of the first and second sets of modular voltage regulation units 610, 612 includes three single-phase modular voltage regulation units. Furthermore, the three single phase modular voltage regulation units 610 form a single three-phase modular voltage regulation unit 603. Similarly, the three-single phase modular voltage regulation units 612 form a single three-phase modular voltage regulation unit 605.

Additionally, each of the distribution casings 604, 608 includes horizontal busbars, such as the horizontal busbars 204, 206 of FIG. 3. In the example of FIG. 10, the horizontal busbars corresponding to the three phases may be represented as x, y, and z.

Also, each modular voltage regulation unit 610 is coupled to a respective busbar x, y, and z. In a similar fashion, each of the modular voltage regulation units 612 is coupled to a corresponding busbar x, y, and z.

Furthermore, in accordance with aspects of the present specification, a modular voltage regulation unit coupled to a given horizontal busbar in a distribution casing is coupled in series to a modular voltage regulation unit coupled to a corresponding horizontal busbar in another distribution casing. By way of example, the modular voltage regulation unit 610 that is coupled to the horizontal busbar x in the first distribution casing 604 is coupled in series with the modular voltage regulation unit 612 that is coupled to the horizontal busbar x in the second distribution casing 608 via a phase conductor of the distribution feeder 602. In a similar manner, the modular voltage regulation units 610 that are coupled to the horizontal busbars y and z in the first distribution casing 604 are coupled in series with the modular voltage regulation units 612 that are respectively coupled to the busbars y and z of the second distribution casing 608 via respective phase conductors of the distribution feeder 602. The series coupling of modular voltage regulation units 610, 612 in the first and second distribution casings 604, 608 will be described in greater detail with respect to FIG. 11.

Figure 11:
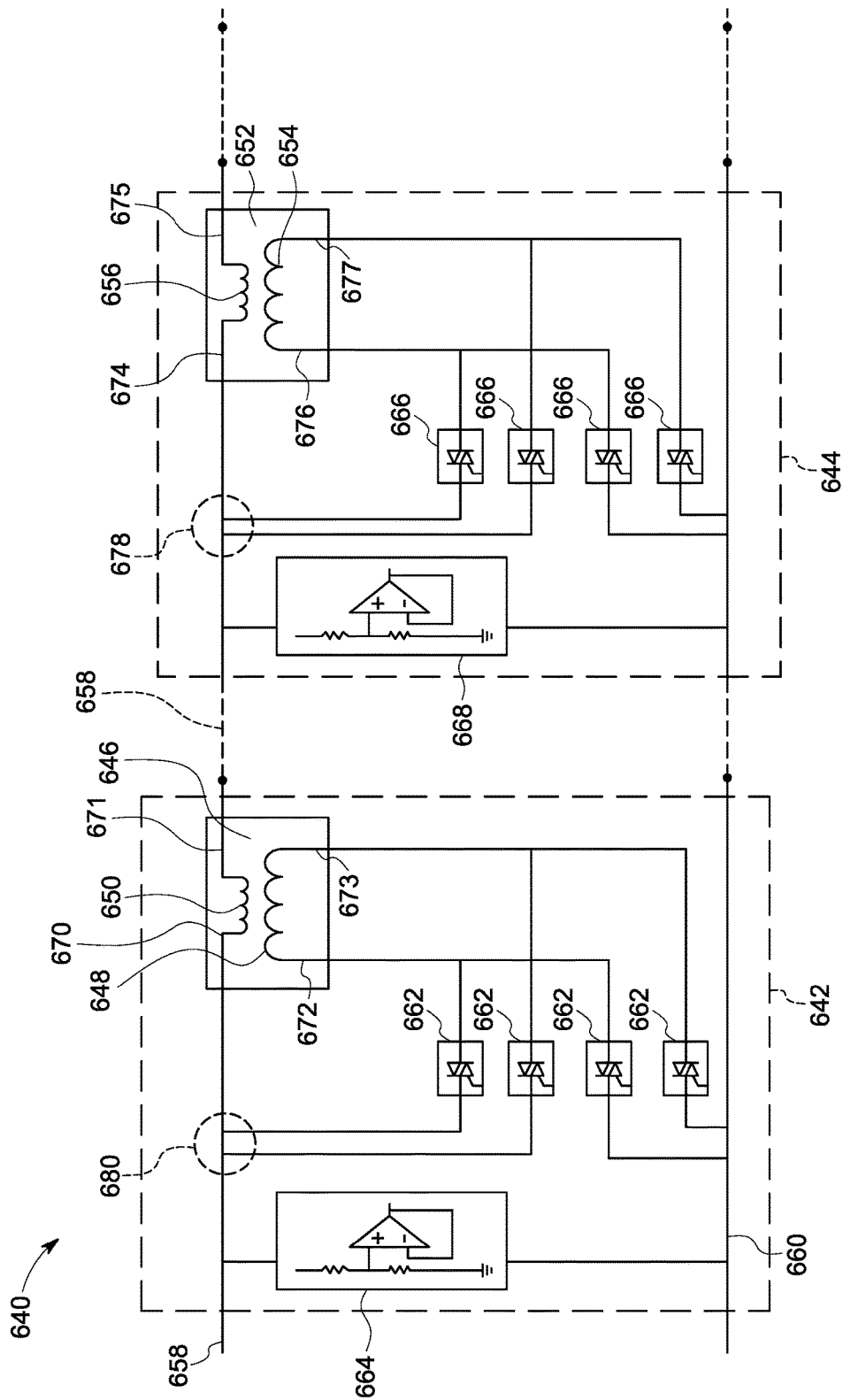
FIG. 11 is a diagrammatical representation of a series coupling of the modular voltage regulation units of FIG. 1 disposed in different distribution casings, according to aspects of the present specification.

Turning now to FIG. 11, a diagrammatical representation 640 of a series coupling of modular voltage regulation units disposed in different distribution casings is depicted. In particular, the schematic 640 of FIG. 11 depicts the series coupling between one modular voltage regulation unit disposed in one distribution casing and another modular voltage distribution unit disposed in another distribution casing.

The schematic 640 depicts a serial coupling between a first modular voltage regulation unit 642 that is disposed in a first distribution casing and a second modular voltage regulation unit 644 that is disposed in a second distribution casing. The first modular voltage regulation unit 642 includes four first switches 662, a first controller 664, and a first transformer 646. Similarly, the second modular voltage regulation unit 644 includes four second switches 666, a second controller 668, and a second transformer 652. The first transformer 646 includes a primary winding 648 and a secondary winding 650 and the second transformer 652 includes a primary winding 654 and a secondary winding 656.

Reference numeral 658 represents a phase conductor. It may be noted that the phase conductor 658 may be representative of a phase conductor corresponding to the distribution feeder 602 (see FIG. 10) or a phase conductor corresponding to the horizontal busbar 204 (see FIG. 2). Also, reference numeral 660 represents a neutral conductor. In one example, the neutral conductor 660 may be representative of a neutral conductor corresponding to the distribution feeder 602 or a neutral conductor corresponding to the horizontal busbar 206 (see FIG. 2).

In the first modular voltage regulation unit 642, the primary winding 648 has a first end 672 and a second end 673 and a secondary winding 650 has a first end 670 and a second end 671. Further, in the second modular voltage regulation unit 644, the primary winding 654 has a first end 676 and a second end 677 and a secondary winding 656 has a first end 674 and a second end 675.

According to aspects of the present specification, in each modular voltage regulation unit, the first end of the secondary winding of the transformer is coupled to at least one of the first and second ends of the primary winding via at least one switch. By way of example, in the first modular voltage regulation unit 642, the first end 670 of the secondary winding 650 is coupled to at least one of the first end 672 and the second end 673 of the primary winding 648 via the first switches 662 at points generally represented by reference numeral 680. In particular, the first and second ends 672, 673 of the primary winding 648 are coupled to the first end 670 of the secondary winding 650 at points 680 when the switches 662 are activated.

In a similar fashion, in the second modular voltage regulation unit 644, the first end 674 of the secondary winding 656 is coupled to at least one of the first end 676 and the second end 677 of the primary winding 654 via the second switches 666 at points generally represented by reference numeral 678. By way of example, the first and second ends 676, 677 of the primary winding 654 are coupled to the first end 674 of the secondary winding 656 at the points 678 when the switches 666 are activated.

In accordance with further aspects of the present specification, the second end of the secondary winding of the transformer of one of the plurality of modular voltage regulation units is coupled to the first end of the secondary winding of the transformer of the other modular voltage regulation unit either directly and/or via at least one phase conductor. Further, at least one of the first and second ends of the primary winding of the transformer is coupled to at least one of the phase conductor and the neutral conductor via at least one switch.

In the example of FIG. 11, the second end 671 of the secondary winding 650 of the transformer 646 of the first modular voltage regulation unit 642 is coupled to the first end 674 of the secondary winding 656 of the transformer 652 of the second modular voltage regulation unit 644 via the phase conductor 658. Also, at least one of the first and second ends 672, 673 of the primary winding 648 of the transformer 646 is coupled to the neutral conductor 660 via the first switches 662. Moreover, at least one of the first and second ends 676, 677 of the primary winding 654 of the transformer 652 is coupled to the neutral conductor 660 via the second switches 666. Implementing the coupling of modular voltage regulation units as described with reference to FIG. 11 advantageously aids in coupling the plurality of modular voltage regulation units that are disposed at different locations along the distribution feeder to one another in a series configuration.

Figure 12:
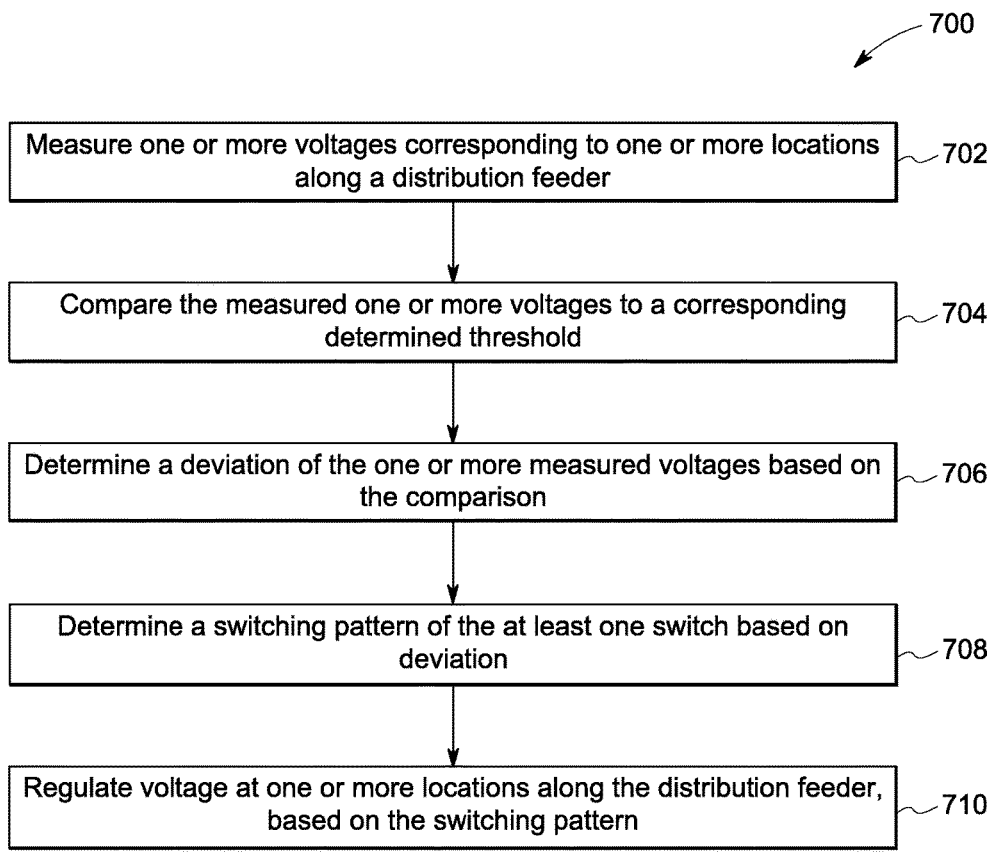
FIG. 12 is a flow chart representing an exemplary method for operating the power distribution system of FIG. 1, according to aspects of the present specification.

FIG. 12 is a flow chart 700 representing an exemplary method of operating a power distribution system to provide a desired value of voltage regulation, according to aspects of the present specification. FIG. 12 will be described with reference to the components of FIG. 1.

As noted hereinabove, the power distribution system 100 includes the power grid 102 coupled to the load 112 via the distribution feeder 106 and the distribution sub-feeders 107. Further, the power distribution system 100 also includes the photovoltaic panel 114 coupled to the distribution feeder 106. Additionally, the power distribution system 100 includes modular voltage regulation units 110 that are coupled to the distribution feeder 106 at different locations along the distribution feeder 106. Also, each modular voltage regulation unit 110 includes a transformer and at least one switch. In addition, the power distribution system 100 includes a controller 126. The controller 126 includes a processing subunit 128 and an electrical parameter sensing subunit 130.

The method begins at block 702, where one or more voltages corresponding to one or more locations along a distribution feeder 106 are measured using a controller 126.

Further, at block 704, the measured voltages are compared to a corresponding determined threshold. In one embodiment, the comparison of block 704 may be performed by the controller 126. In accordance with aspects of the present specification, the measured voltages are compared to the corresponding determined thresholds for a determined period of time in order to avoid any false alarms. Further, if the measured voltage deviates from a corresponding determined threshold for a period that exceeds the determined period of time, then a need for voltage regulation may be established. As previously noted, the determined threshold includes a range of values around a determined set point of voltage.

Subsequent to the comparison of the measured voltages to the corresponding determined thresholds, a deviation of one or more of the measured voltages from the corresponding determined thresholds may be determined, as indicated by block 706. In one embodiment, the controller 126 may be used to determine the deviation(s). In one example, the measured voltage may be higher than an upper band or lower than a lower band of the determined threshold. The deviation of the measured voltage may cause a voltage profile along the distribution feeder 106 to be non-uniform. In particular, deviations of the measured voltages may result in significant fluctuations in the voltage profile along the distribution feeder 106.

Moreover, at block 708, a switching pattern of the switches in the modular voltage regulation units 110 based on the deviation(s) determined at block 706 may be determined. In certain embodiments, the controller 126 may be used to determine the switching pattern. In one example, if the measured voltage is higher than the upper band for a period that is greater than the determined period of time, a switching pattern that facilitates reduction in the voltage along the distribution feeder 106 may be determined. In this example, a magnitude of the desired voltage regulation may be determined based on a value by which the measured voltage exceeds the upper band of the determined threshold.

At block 710, a voltage at one or more locations along the distribution feeder 106 is regulated based on the switching pattern determined at block 708 to provide the desired value of voltage regulation. The controller 126 may be used to regulate the voltage based on the switching pattern. The switches of the modular voltage regulation units 110 may be selectively switched based on the determined switching pattern to achieve a desired value of voltage regulation. As previously noted, the desired values of voltage regulation may include positive and/or negative values of voltage regulation.

This regulation of the voltage along the distribution feeder 106 aids in reducing fluctuations in the voltage profile. Thus, a relatively flatter voltage profile may be maintained along the distribution feeder 106.

Furthermore, the foregoing examples, demonstrations, and process steps such as those that may be performed by the system may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java. Such code may be stored or adapted for storage on one or more tangible, machine readable media, such as on data repository chips, local or remote hard disks, optical disks (that is, CDs or DVDs), memory or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

Various embodiments of a power distribution system configured to provide desired values of voltage regulation and a method for providing desired values of voltage regulation in a power distribution system are presented. Moreover, since the exemplary voltage regulation units used in the power distribution system are modular in structure, the number of voltage regulation units used to achieve desired values of voltage regulation may be appropriately adjusted. Furthermore, the distribution of the modular voltage regulation units in series along the distribution feeder aids in maintaining a relatively flatter voltage profile along the distribution feeder. Additionally, the exemplary modular voltage regulation units may be retrofit into an existing distribution casing, thereby circumventing use of dedicated cabinets for installation. Furthermore, the cost of the modular voltage regulation units is relatively lower due to use of a smaller number of switches. Moreover, the power distribution system may find application in any power distribution network. It may be noted that the conventional modular voltage regulation units are typically configured to provide 6-8% of voltage regulation. However, the exemplary modular voltage regulation unit is configured to provide much lower values of voltage regulation when compared to those provided by the conventional voltage regulation devices.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

The invention claimed is:

1. A power distribution system for providing a desired value of voltage regulation, the system comprising:
   a plurality of modular voltage regulation units coupled to a distribution feeder, wherein each of the plurality of modular voltage regulation units comprises:
      a transformer comprising a primary winding having a first end and a second end and a secondary winding having a first end and a second end; and
      at least one switch coupled to the primary winding of the transformer, wherein the first end of the secondary winding is coupled to at least one of the first and second ends of the primary winding via the at least one switch;
   wherein the second end of the secondary winding of the transformer of one of the plurality of modular voltage regulation units is coupled to the first end of the secondary winding of the transformer of another modular voltage regulation unit directly, via at least one phase conductor, or a combination thereof.

2. The system of claim 1, further comprising a controller coupled to one or more of the plurality of modular voltage regulation units and configured to control operation of the plurality of modular voltage regulation units to provide the desired value of voltage regulation.

3. The system of claim 2, wherein the controller comprises an electrical parameter sensing subunit, a processing subunit, or both.

4. The system of claim 1, wherein the transformer comprises at least one of a single phase transformer and a three phase transformer.

5. The system of claim 1, wherein the at least one switch comprises a solid state electronic switch.

6. The system of claim 1, wherein the plurality of modular voltage regulation units is configured to modify a voltage corresponding to one or more locations along the distribution feeder based on the desired value of voltage regulation.

7. The system of claim 1, wherein the plurality of modular voltage regulation units is disposed in one or more distribution casings.

8. The system of claim 7, wherein the one or more distribution casings comprise one or more fuse bases, one or more cable connectors, one or more busbars, one or more racks, or combinations thereof.

9. The system of claim 8, wherein the plurality of modular voltage regulation units is coupled to the one or more racks.

10. The system of claim 1, wherein the distribution feeder comprises the at least one phase conductor and a neutral conductor.

11. The system of claim 10, wherein the plurality of modular voltage regulation units is coupled in series directly, via the at least one phase conductor and the neutral conductor of the distribution feeder, or a combination thereof.

12. The system of claim 10, wherein at least one of the first and second ends of the primary winding of the transformer is coupled to at least one of the phase conductor and the neutral conductor via the at least one switch.

13. The system of claim 1, further comprising a communication channel configured to communicatively couple the plurality of modular voltage regulation units.

14. A method of operating a power distribution system to provide a desired value of voltage regulation, wherein the power distribution system comprises a distribution feeder and a plurality of modular voltage regulation units, the method comprising:
   measuring, using an electrical parameter sensing subunit, one or more voltages corresponding to one or more locations along the distribution feeder, wherein the distribution feeder is configured to couple at least one power source to at least one sink, and wherein each of the plurality of modular voltage regulation units is coupled to the distribution feeder and comprises:
      a transformer comprising a primary winding having a first end and a second end and a secondary winding having a first end and a second end;
      at least one switch coupled to the primary winding of the transformer, wherein the first end of the secondary winding is coupled to at least one of the first and second ends of the primary winding via the at least one switch;
      wherein the second end of the secondary winding of the transformer of one of the plurality of modular voltage regulation units is coupled to the first end of the secondary winding of the transformer of another modular voltage regulation unit directly, via at least one phase conductor, or a combination thereof;
   comparing, using a processing subunit, the measured one or more voltages to a corresponding determined threshold;
   determining, using the processing subunit, a switching pattern of the at least one switch based on the comparison; and
   regulating, using the processing subunit, a voltage at one or more locations along the distribution feeder based on the switching pattern to provide the desired value of voltage regulation.

15. The method of claim 14, further comprising selectively switching the at least one switch based on the switching pattern to provide the desired value of voltage regulation.

16. The method of claim 14, wherein the determined threshold comprises a range of values around a determined set point of voltage.

17. The method of claim 16, wherein comparing the measured voltage to the determined threshold further comprises determining a deviation of the measured voltage from the range of values around the determined set point of voltage for a determined period of time.

18. A distribution casing, comprising:
- a housing comprising one or more racks, one or more fuse bases, one or more cable connectors, one or more busbars, or combinations thereof; and
- a plurality of voltage regulation units disposed in the housing, wherein a first voltage regulation unit of the plurality of voltage regulation units is coupled in series with a second voltage regulation unit of the plurality of voltage regulation units, and wherein each of the plurality of voltage regulation units comprises:
  - a transformer comprising a primary winding having a first end and a second end and a secondary winding having a first end and a second end; and
  - at least one switch coupled to the primary winding of the transformer, wherein the first end of the secondary winding is coupled to at least one of the first and second ends of the primary winding via the at least one switch;
 wherein the second end of the secondary winding of the transformer of the first voltage regulation unit is coupled to the first end of the secondary winding of the transformer of the second voltage regulation unit directly, via at least one phase conductor, or a combination thereof.

19. The casing of claim 18, wherein the plurality of voltage regulation units are configured to provide a desired voltage regulation.

\* \* \* \* \*